United States Patent [19]

Glickstein et al.

[11] 4,107,335

[45] Aug. 15, 1978

[54] FREEZE-DRIED MIX FOR SPOONABLE SALAD DRESSING AND METHOD THEREFOR

[75] Inventors: Myer Glickstein; Justin M. Tuomy, both of Framingham; Marianne J. Shwert, Natick, all of Mass.

[73] Assignee: The United States of America as represented by the Secretary of the Army, Washington, D.C.

[21] Appl. No.: 785,804

[22] Filed: Apr. 8, 1977

[51] Int. Cl.² ............................................. A23L 1/24
[52] U.S. Cl. ...................................... 426/96; 426/103; 426/601; 426/605; 426/613; 426/444
[58] Field of Search ................... 426/96, 98, 103, 601, 426/605, 613, 804, 444, 605

[56] References Cited

U.S. PATENT DOCUMENTS

| | | | |
|---|---|---|---|
| 2,168,360 | 8/1939 | Musher | 426/613 |
| 2,471,435 | 5/1949 | Kimball | 426/98 |
| 3,968,261 | 7/1976 | Goodman | 426/613 |

OTHER PUBLICATIONS

Bulletin #RC-31, Avicel RC In Canned Goods, FMC Corp., Am. Viscose Div., Marcus Hook, Pa., pp. 21-24, 29.

*Primary Examiner*—Jeanette M. Hunter
*Attorney, Agent, or Firm*—Nathan Edelberg; Robert P. Gibson; Charles C. Rainey

[57] ABSTRACT

A free-flowing, freeze-dried salad dressing mix containing a high proportion of salad oil which is reconstituted by mixing water only therewith to produce a spoonable salad dressing, and method of preparing the mix. Also, the compressed, freeze-dried salad dressing mix, which reconstitutes easily to a spoonable salad dressing by mixing water only therewith.

4 Claims, No Drawings

FREEZE-DRIED MIX FOR SPOONABLE SALAD DRESSING AND METHOD THEREFOR

The invention described herein may be manufactured, used, and licensed by or for the Government for governmental purposes without the payment to us of any royalty thereon.

BACKGROUND OF THE INVENTION

This invention relates to a free-flowing, freeze-dried salad dressing mix which contains a high proportion of salad oil and which upon rehydration by the addition of water only thereto and thorough mixing therewith produces a spoonable salad dressing which is substantially equivalent in acceptability to freshly prepared, spoonable salad dressing made with a similar high proportion of salad oil along with starch, egg yolk, liquid vinegar, spices and other conventional salad dressing ingredients. The invention also relates to a compressed, freeze-dried salad dressing mix or composition which contains a high proportion of salad oil and which is similarly capable of producing a spoonable salad dressing with essentially the same characteristics as the salad dressing produced from the free-flowing, freeze-dried salad dressing mix prior to compression thereof.

There has not been heretofore, to our knowledge, a free-flowing, freeze-dried salad dressing mix having a high salad oil content and the capability of being reconstituted to a highly acceptable, spoonable salad dressing of high salad oil content by the simple mixing of water only therewith. There also has not been heretofore, to our knowledge, a freeze-dried salad dressing mix prepared by the freeze-drying of a complete salad dressing having a high proportion of salad oil therein as well as starch, egg yolk, vinegar, and other conventional salad dressing ingredients. There also has not been heretofore, to our knowledge, a compacted, freeze-dried salad dressing mix prepared by the freeze-drying of a complete salad dressing which contains a high proportion of salad oil. Furthermore, there has not been such a compacted, freeze-dried salad dressing mix which is capable of producing a spoonable salad dressing with essentially the same characteristics as a freshly prepared salad dressing produced from the same salad dressing ingredients but without freeze-drying and compression thereof.

Such types of salad dressing mixes have apparently been lacking largely because of the susceptibility of commercially produced salad dressings to breakdown of the emulsions thereof upon freezing and drying. We have discovered through our repeated efforts to freeze-dry commercial, spoonable salad dressings that none of the commonly available brands of such salad dressings could be successfully freeze-dried.

It is, therefore, an object of the present invention to provide a freeze-dried mix suitable for making a spoonable salad dressing therefrom simply by the mixing of water therewith.

Another object is to provide a freeze-dried salad dressing mix which contains a relatively high proportion of salad oil, yet is a free-flowing, powdery or granular salad dressing mix and which, upon mixing with water only, forms a spoonable salad dressing which has a relatively high proportion of salad oil therein.

A further object is to provide a compacted freeze-dried salad dressing mix which contains a relatively high proportion of salad oil and which is capable of being readily reconstituted into a spoonable salad dressing by simply mixing a suitable amount of water with the compacted, freeze-dried salad dressing mix.

Other objects and advantages will become apparent from the following description of the invention.

SUMMARY OF THE INVENTION

A freeze-dried salad dressing mix, which is capable of being reconstituted by the mixing of a suitable amount of water only therewith to produce a spoonable salad dressing, is prepared by formulating a salad dressing containing a high proportion of vegetable type salad oil and certain emulsion-stabilizing ingredients, particularly microcrystalline cellulose powder, modified with sodium carboxymethylcellulose, and a non-ionic surface-active agent, e.g. polyoxyethylene sorbitan monostearate, as well as various conventional ingredients of spoonable type salad dressings, and freeze-drying such a salad dressing. The invention also relates to compacted, i.e. compressed, freeze-dried salad dressing mixes which are capable of being readily reconstituted by the mixing of water only with the compressed, freeze-dried salad dressing mix to produce spoonable salad dressings having high proportions of salad oil therein.

DESCRIPTION OF THE PREFERRED EMBODIMENT

We have discovered how freeze-dried salad dressing mixes may be prepared containing relatively high proportions of salad oil which will be free-flowing in the non-compacted state, or which may be compacted to as little as 50 percent of the original volume occupied by the free-flowing, freeze-dried salad dressing mixes, and which either in the non-compacted state or the compacted state are capable of being reconstituted into highly acceptable, spoonable salad dressings containing relatively high proportions of salad oil simply by mixing the freeze-dried salad dressing mix or the compacted, freeze-dried salad dressing mix with water only at about room temperature, or even at lower temperatures, if desired. Such free-flowing, freeze-dried salad dressing mixes may be prepared by freeze-drying specially formulated salad dressings containing high proportions of salad oil or a combination of salad oils.

The freeze-dried salad dressing mix of the invention is prepared by first preparing a spoonable type salad dressing having a relatively high proportion of salad oil and including small quantities of certain unconventional salad dressing ingredients which cooperate with the salad oil and other conventional salad dressing ingredients to produce a salad dressing which can be freeze-dried and subsequently reconstituted into a spoonable salad dressing very similar to the salad dressing prior to freezing and freeze-drying thereof. One of the more important ingredients from the standpoint of restoring the freeze-dried salad dressing mix to a good quality salad dressing by thorough mixing of the former with a suitable quantity of water is a microcrystalline cellulose powder modified with sodium carboxymethylcellulose, the latter contributing importantly to the dispersibility of the microcrystalline cellulose and the salad oil globules, on which the microcrystalline cellulose is adsorbed. The particular microcrystalline cellulose powder employed is "Avicel" RC-591, a product of FMC Corporation, Marcus Hook, Pennsylvania. This material is a white, water dispersible powder comprising about 89 ± 1 percent microcrystalline cellulose and about 11 ± 1 percent sodium carboxymethylcellulose (CMC), the process of making which is disclosed in U.S. Pat. No 3,539,365, the method of making the microcrystalline cellulose being described more particularly in U.S. Pat. No. 2,978,446. It has a specific gravity of 1.55 and other properties and characteristics described in Bulletin RC-22 and Bulletin RC-27, published by FMC Corporation, Avicel Department, Marcus Hook, Pennsylvania 19061. It apparently forms a film of great strength, keeping the globules of salad oil separated in the original salad dressing emulsion containing a considerable amount of water, through the freezing and freeze-drying of the salad dressing, and then assists greatly in redispersing the globules of oil in the water mixed with the freeze-dried salad dressing mix to produce the reconstituted salad dressing.

Another important ingredient of the salad dressing, the contribution of which carries over into the freeze-dried salad dressing mix, is the non-ionic surface-active agent. The preferred product of this type used is "Tween 60", a polyoxyethylene sorbitan monostearate manufactured by ICI United States, Inc., Wilmington, Del. This material supplements the emulsifying properties of the egg yolk solids, a conventional ingredient of salad dressings, and also of the microcrystalline cellulose.

Mustard, which is a conventional ingredient of many salad dressings, also cooperates with the egg yolk solids, the microcrystalline cellulose, and the non-ionic surface-active agent in imparting the strength and stability needed to carry the salad dressing through the freezing, freeze-drying, and reconstitution to a salad dressing quite similar to the original salad dressing before freezing and freeze-drying thereof. However, without the microcrystalline cellulose and the non-ionic surface-active agent the egg yolk solids and the mustard would be inadequate to prevent coalescence of the salad oil following freezing and drying of the salad dressing and also inadequate to restore the oil to a stable salad dressing and also inadequate to restore the oil to a stable salad dressing emulsion upon reconstitution with water following freeze-drying of the original salad dressing.

The salad dressing which is to be freeze-dried is prepared with a composition falling within the ranges given in Table 1. It will be seen that the greatest ranges are in the salad oil and water contents.

Table 1

| Composition Of Salad Dressing To Be Freeze-dried | |
|---|---|
| Ingredient | Percent of Mixtue |
| Salad oil (vegetable type) | 20.0 – 40.6 |
| Microcrystalline cellulose powder, (CMC-modified) | 0.14 – 0.16 |
| Pregelatinized starch | 4.8 – 7.9 |
| Unmodified food starch | 1.0 – 3.1 |
| Egg yolk solids | 4.9 – 7.1 |
| Dry, synthetic vinegar | 1.9 – 2.1 |
| Hot water-soluble gum | 0.3 – 0.6 |
| Sugar | 9.9 – 10.1 |
| Salt | 1.9 4 2.1 |
| Dry, powdery spice | 0.9 – 1.1 |
| Non-ionic surface-active agent | 0.14 – 0.19 |
| Water | 33.5 – 45.5 |

The salad dressing is prepared according to the following procedure:

a. the pregelatinized starch and the unmodified food starch are dry blended;

b. about 80 to 90 percent of the water is mixed with the dry blend from step a. to form a slurry;

c. the slurry formed in step b. is cooked at about 85° C. to 88° C. for about 10 to about 15 minutes until the slurry is converted to a translucent mass;

d. sufficient extra water is added to the translucent mass to restore all water lost during the cooking of step c, while thoroughly mixing the mass;

e. the remaining about 10 to about 20 percent of the water is divided into two equal portions of water;

f. the microcrystalline cellulose powder is mixed with one of the remaining portions of water to form a paste;

g. the hot water-soluble gum, which is preferably food grade agar, is mixed with the other of the remaining portions of water to form a suspension thereof in the water;

h. the suspension of the hot water-soluble gum is heated for about 10 minutes at about 100° C. to form an aqueous solution of the gum;

i. the sugar, salt, egg yolk solids, and dry, powdery spice, which is preferably dry mustard powder, are dry mixed;

j. the microcrystalline cellulose paste, the aqueous solution of the gum, and the mixture obtained in step i. are mixed with the translucent mass of step d. at about 85° C. to about 88° C. using a vertical cutter mixer, such as a Hobart VCM vertical cutter mixer, for about 2 minutes at low speed and thereafter for an additional 2 to 3 minutes at high speed while slowly adding a dispersion of the non-ionic surface-active agent, which is preferably "Tween 60", a polyoxyethylene sorbitan monostearate, in the vegetable-type salad oil until a salad dressing of suitable consistency to be spoonable is obtained;

k. the salad dressing is spread on freeze drying trays to a substantially uniform depth of about 1 to 1.5 cm;

l. the salad dressing on the freeze drying trays is frozen in a conventional blast freezer over a period of about 3 to about 4 hours;

m. the trays of frozen salad dressing are quickly subjected to an absolute pressure of about 199 Pa (equivalent to about 1.5 mm of mercury) and freeze-dried in a conventional freeze-dryer while applying sufficient heat at about 26.5° to about 35° C. (after the pressure has been thus reduced) to reduce the moisture content of the salad dressing to not more than 2% after about 20 to about 24 hours of freeze-drying;

n. the freeze-dried salad dressing, having a consistency about like that of peanut brittle, though somewhat less vitreous and hard, is coarsely ground at a slow apeed to avoid extrusion of oil; and o. the dry, synthetic vinegar is thoroughly mixed with the coarsely ground, freeze-dried salad dressing to produce the final freeze-dried salad dressing mix.

The freeze-dried salad dressing mix is packaged, preferably hermetically sealed in air- and moisture-proof containers, and for long-term storage under at least 27 inches vacuum after flushing the container containing the freeze-dried salad dressing mix with nitrogen.

For long-term storage it is preferable that the freeze-dried salad dressing mix have a moisture content no greater than 2% and preferably from about 1 to about 2% and that the moisture content be maintained at such a low level by in-package desiccation, e.g. by inclosing therewith a moisture vapor permeable Kraft paper envelope containing sufficient calcium oxide to reduce the moisture content of the mix to that level relatively soon after completion of packaging and maintaining the moisture content at that level for the planned storage time.

The freeze-dried salad dressing mix may also be compressed at about 250 psi, with no dwell time, in a Carver or Dennison or other type press, to form discs or blocks having a volume as low as 50 percent of the volume of the freeze-dried salad dressing mix prior to compression thereof, i.e. at a compression ratio of up to 2:1, and preferably from about 1.1:1 to 2:1, the compression ratio being defined as the ratio of the volume occupied by the lightly shaken, uncompressed material to the volume occupied by the compressed material. Higher compression ratios may result in extrusion of some oil. The compressed discs or blocks (usually containing about 150 g of freeze-dried salad dressing mix per disc or block) are hermetically sealed in metal cans (four discs to a No. 2½ can) or in an oxygen- and water vapor-proof, flexible, laminated package formed of an outer layer of a polyester, e.g. polyethylene terephthalate, film or nylon film, a layer of aluminum foil about 0.35 mils thick, and an inner, heat-sealable layer, e.g. polyethylene, while a vacuum of about 28 inches of mercury is being drawn on the package to remove substantially all air from the hermetically sealed, compressed, freeze-dried salad dressing mix and to cause the flexible, laminated package to be drawn tightly around all surfaces of the compressed disc or block of freeze-dried salad dressing mix. The compressed, freeze-dried salad dressing mix preferably contains no more than 2% moisture and may be maintained at such a low moisture level by in-package desiccation, if needed to maintain stability.

The freeze-dried salad dressing mix, in either the uncompressed or the compressed state has a composition falling within the ranges given in Table 2, exclusive of the moisture content.

Table 2

| Composition Of Freeze-dried Salad Dressing Mix | |
|---|---|
| Ingredient | Percent of freeze-dried mix |
| Salad oil (vegetable type) | 36.8 – 60.0 |
| Microcrystalline cellulose powder, (CMC-modified) | 0.2 – 0.3 |
| Pregelatinized starch | 7.9 – 14.5 |
| Unmodified food starch | 1.5 – 5.6 |
| Egg yolk solids | 7.4 – 13.0 |
| Dry synthetic vinegar | 2.9 – 3.85 |
| Hot water-soluble gum | 0.6 – 1.1 |
| Sugar | 14.9 – 18.6 |
| Salt | 2.9 – 3.9 |
| Dry, powdery spice | 1.4 – 2.0 |
| Non-ionic surface-active agent | 0.2 – 0.35 |

Reconstitution of the freeze-dried salad dressing mix may be carried out in the following manner:

A. Hand Mixing

1. Remove 150 g disc from package and crumble into a bowl or pour 150 g of uncompressed freeze-dried salad dressing mix into bowl.
2. Add 130 g of water at 16°–21° C. and let stand for 15 minutes.
3. Mash the solids with a fork and refrigerate the mixture for about 30 minutes.
4. Whip the mixture until smooth, reconstituted salad dressing is obtained.

B. Mechanical Mixing

1. Remove 150 g disc from package and crumble into a mixing bowl or pour 150 g of uncompressed freeze-dried salad dressing mix into mixing bowl.
2. Add 130 g of water at 16°–21° C. and let stand for 15 minutes.
3. Whip in mechanical mixer at medium speed until smooth, reconstituted salad dressing is obtained.

(Note: Amount of water may be varied, if desired, to produce a thicker or thinner bodied salad dressing)

Yield: 150 g disc = 169 ml results in 280 g salad dressing = 281 ml.

The invention will be more particularly described in the following example.

EXAMPLE

A spoonable salad dressing is prepared in accordance with steps a. through j. of the above-described procedure employing the ingredients listed in the percentages given in Table 3.

Table 3

| Composition of Salad Dressing To Be Freeze-dried | |
|---|---|
| Ingredient | Percent of mixture |
| Corn oil (vegetable type salad oil) | 35.0 |
| Microcrystalline cellulose powder, (CMC-modified), "Avicel" RC-591 | 0.15 |
| Pregelatinized starch | 4.8 |
| Unmodified food starch | 1.05 |
| Egg yolk solids | 5.0 |
| Dry, synthetic vinegar | 2.0 |
| Agar (hot water-soluble gum) | 0.3 |
| Sugar | 10.0 |
| Salt | 2.0 |
| Mustard, dry powdered (dry, powdery spice) | 1.0 |
| Polyoxyethylene sorbitan monostearate ("Tween 60"), (non-ionic surface-active agent) | 0.15 |
| Water | 38.55 |
| | 100.00 |

The resulting salad dressing is frozen and then freeze-dried in accordance with steps k. through o. of the above-described procedure.

The freeze-dried salad dressing mix has the approximate composition given in Table 4, exclusive of the moisture content.

Table 4

| Composition of Freeze-dried Salad Dressing Mix | |
|---|---|
| Ingredient | Percent of freeze-dried mix |
| Corn oil | 56.95 |
| Microcrystalline cellulose powder (CMC-modified), "Avicel" RC-591 | 0.24 |
| Pregelatinized starch | 7.81 |
| Unmodified food starch | 1.71 |
| Egg yolk solids | 8.14 |
| Dry, synthetic vinegar | 3.26 |
| Agar (hot water-soluble gum) | 0.48 |
| Sugar | 16.28 |
| Salt | 3.26 |
| Mustard, dry powdered | 1.63 |
| Polyoxyethylene sorbitan monostearate ("Tween 60"), non-ionic surface-active agent | 0.24 |
| | 100.00 |

The freeze-dried salad dressing mix is compressed at about 250 psi, with no dwell time, in a Carver press to form discs having a diameter of 3⅝ inches and a height of 1 inch and weighing 150 g, the compression ratio being approximately 2:1. Each disc is packaged in an oxygen-and water vapor-proof, flexible, 3-ply laminated package formed of an outer layer of polyethylene terephthalate film, an inner, heat-sealable layer of polyethylene, and a layer of aluminum foil 0.35 mil thick sandwiched between the outer and inner layers. A vacuum of about 28 inches of mercury is drawn on the package and the package is heat sealed while under the vacuum.

Reconstitution of a disc of the freeze-dried salad dressing mix is carried out in accordance with the procedure for reconstitution of the freeze-dried salad dressing mix described above. About 280 g or 281 ml or spoonable salad dressing having quite good organoleptic characteristics results from the reconstitution.

The invention has been described with respect to the use of corn oil as the salad oil. However, other vegetable seed oil types may be used, either alone or in combination with corn oil or with each other, or blends of several vegetable type salad oils, may be used. Cottonseed oil, peanut oil, safflower oil, or high stability soybean oil may be used in place of corn oil or in combinations as mentioned above. The important requirement for a stable, freeze-dried salad dressing mix is that the oil have good shelf stability.

The dry, synthetic vinegar may be of several types, but is preferably of the type specified in Military Specification, MIL-V-35017D, "Vinegar, Dry, Synthetic", which has the formulation shown in Table 5.

Table 5

Composition Of Dry, Synthetic Vinegar

| Ingredients | Percent by weight |
| --- | --- |
| Sodium diacetate | 39.3 |
| Sodium Acetate | 10.0 |
| Malic Acid | 50.0 |
| Caramel, dry | 0.1 |
| Apple flavor (spray-dried) | 0.1 |
| Tricalcium phosphate | 0.5 |

It is to be understood that by "spoonable" we mean that the salad dressing has the general consistency characteristic of high quality commercial mayonnaise or sour cream.

All percentages of ingredients or of water expressed in the specification and claims are to be understood as being by weight unless otherwise stated.

The freeze-dried salad dressing mixes of the present invention are particularly useful where storage space for salad dressings or other foods is at a premium, as in submarines, and where long-term storage of salad dressings without refrigeration is desirable. This is particularly advantageous to the Armed Forces, but will be readily understood to provide advantages for civilian campers, hunters, and travelers. The compressed, freeze-dried salad dressing mixes may very easily be compressed in the form of tablets or small discs and packaged in flexible air- and moisture-proof pouches for reconstitution and use for a single salad at a time or for use as a spread for sandwiches. The uncompressed, freeze-dried salad dressing mixes may be similarly packaged and reconstituted in small quantities shortly before time for consumption in conjunction with a salad or for use as a sandwich spread.

We wish it to be understood that we do not desire to be limited to the exact details described, for obvious modifications will occur to a person skilled in the art.

We claim:

1. A method of preparing a free-flowing, dry salad dressing mix which is characterized by being reconstituted into a spoonable salad dressing by the mixing of water therewith, which comprises preparing a mixture for subjection to freeze-drying, said mixture comprising the following composition prior to freeze drying thereof:

| Ingredient | Percent of mixture |
| --- | --- |
| Salad oil (vegetable type) | 20.0 – 40.6 |
| Microcrystalline cellulose powder, (CMC-modified) | 0.14 – 0.16 |
| Pregelatinized starch | 4.8 – 7.9 |
| Unmodified food starch | 1.0 – 3.1 |
| Egg yolk solids | 4.9 – 7.1 |
| Dry synthetic vinegar | 1.9 – 2.1 |
| Hot water-soluble gum | 0.3 – 0.6 |
| Sugar | 9.9 – 10.1 |
| Salt | 1.9 – 2.1 |
| Dry powdery spice | 0.9 – 1.1 |
| Non-ionic surface-active agent | 0.14 – 0.19 |
| Water | 33.5 – 45.5 | by the steps of:
a. mixing said pregelatinized starch and said unmodified food starch to form a dry blend,
b. mixing about 80 to about 90 percent of said water with said dry blend to form a slurry,
c. cooking said slurry at about 85° C. to 88° C. for about 10 to about 15 minutes until said slurry is converted to a translucent mass,
d. restoring the quantity of water lost by evaporation during said cooking while thoroughly mixing said translucent mass,
e. dividing the remaining about 10 to about 20 percent of said water into two equal remaining water portions,
f. mixing said microcrystalline cellulose powder with one of said remaining water portions to form a paste,
g. mixing said hot water-soluble gum with the other of said remaining water portions to form a suspension of said gum,
h. heating said suspension of said gum for about 10 minutes at about 100° C. to form an aqueous solution of said gum,
i. mixing said sugar, said salt, said egg yolk solids, and said dry, powdery spice,
j. mixing said microcrystalline cellulose paste, said aqueous solution of said gum, said mixture of said sugar, said salt, said egg yolk solids, and said dry, powdery spice with said translucent mass at about 85° C. to about 88° C. in a vertical cutter mixer for about 2 minutes at low speed, then for an additional mixing period of 2 – 3 minutes at high speed while slowly adding a dispersion of said non-ionic surface-active agent in said vegetable salad oil to form a salad dressing,
k. spreading said salad dressing to a substantially uniform depth of about 1 to 1.5 cm on freeze drying trays,
l. blast freezing said salad dressing on said freeze drying trays for about 3 to about 4 hours,
m. freeze-drying said salad dressing for about 20 to about 24 hours until the moisture content of the salad dressing is reduced to not more than 2%,
n. grinding the freeze-dried salad dressing at slow speed to form a coarsely ground, freeze-dried salad dressing, and
o. thoroughly mixing said dry, synthetic vinegar with said coarsely ground, freeze-dried salad dressing to produce said free-flowing, dry salad dressing mix.

2. Method according to claim 1, wherein said vegetable salad oil is corn oil and said non-ionic surface-active agent is polyoxyethylene sorbitan monostearate.

3. Method according to claim 2, wherein said cold water-soluble gum is food grade agar and said dry, powdery spice is mustard.

4. A free-flowing, dry salad dressing mix produced in accordance with the method of claim 1.

* * * * *